United States Patent [19]
Biles

[11] Patent Number: 5,731,108
[45] Date of Patent: Mar. 24, 1998

[54] FULL COLOR HOLOGRAMS AND METHOD OF MAKING THE SAME

[76] Inventor: Jonathan R. Biles, 1422 SE. Knight St., Portland, Oreg. 97202

[21] Appl. No.: 445,567

[22] Filed: Apr. 3, 1995

Related U.S. Application Data

[63] Continuation of Ser. No. 48,049, Apr. 14, 1993, abandoned.
[51] Int. Cl.$^6$ .................................................... G03H 1/28
[52] U.S. Cl. .................... 430/1; 430/2; 359/3; 359/15
[58] Field of Search .............................. 430/1, 2, 290; 359/3, 15, 22, 23, 24

[56] References Cited

U.S. PATENT DOCUMENTS

| | | | |
|---|---|---|---|
| 3,506,327 | 4/1970 | Leith et al. | 430/1 |
| 3,834,786 | 9/1974 | Carlsen | 359/24 |
| 4,201,441 | 5/1980 | Matsumoto et al. | 359/3 |
| 4,411,489 | 10/1983 | McGraw | 359/23 |
| 4,701,005 | 10/1987 | Noguchi | 359/17 |
| 4,769,300 | 9/1988 | Butcher | 430/1 |
| 4,769,301 | 9/1988 | Butcher et al. | 430/1 |
| 4,788,115 | 11/1988 | Long et al. | 430/1 |
| 4,816,366 | 3/1989 | Doyle et al. | 430/1 |
| 4,913,990 | 4/1990 | Rallison | 430/1 |
| 4,977,047 | 12/1990 | Ashford et al. | 430/1 |
| 4,986,619 | 1/1991 | Walker et al. | 430/2 |
| 4,992,346 | 2/1991 | Ashford et al. | 430/1 |
| 5,011,244 | 4/1991 | Smith et al. | 359/22 |

FOREIGN PATENT DOCUMENTS

| | | | |
|---|---|---|---|
| 0324482 | 7/1989 | European Pat. Off. | 430/2 |
| 1-200385 | 8/1989 | Japan . | |

OTHER PUBLICATIONS

McGraw "Color Control in . . . " SPIE vol. 215 (1980) pp. 24–31.

Coleman et al. "Controlled Shifty of hte Spectral Response . . . " Appl. Opt. 20 #15 pp. 2600–2601 (1981).

Caulfield et al. "Applications of Heterography" Wiley–Intersive © 1970 pp. 44–47.

Hariharan "Pseudo Colour images . . . " Opt. Comm. 35 #1 (Oct. 1990) p. 42.

"Color Control in Dichromated Gelatin Reflection Holograms", by Stephen McGraw, SPIE, 1980, vol. 215, pp. 24–31.

"The Reproduction of Color", by Graham Saxby, Practical Holography, published by Prentice Hall 1988, pp. 402–405.

"Multicolor Images With Volume Photopolymer Holograms", by E.T. Kurtzner and K.A. Haines, Applied Optics, vol. 10, No. 9, Sep. 1971, p. 2194.

*Primary Examiner*—Martin Angebranndt
*Attorney, Agent, or Firm*—Olson & Olson

[57] ABSTRACT

A full color hologram is made by exposing a holographic emulsion to the 514 nm and 458 nm lines of an argon laser and the 413 nm line of a krypton laser. The hologram can be returned to its original thickness and used as a master with the same three wavelengths, or it can be swelled to longer wavelengths to reconstruct with red, green and blue light. The source of the red, green and blue information may be acquired by an electronic video signal displayed on an electronic image modulator.

9 Claims, 2 Drawing Sheets

FULL COLOR HOLOGRAMS AND METHOD OF MAKING THE SAME

This application is a continuation, of application Ser. No. 08/048,049, filed 14 Apr. 1993, now abandoned.

This invention relates to holograms, and more particularly to full color holograms and method of making the same.

Holograms have been exposed in dichromated gelatin (DCG) with the three argon laser lines having wavelengths of 514.5 nm (blue-green color), 488.0 nm (blue), and 457.9 nm (deep blue). These three wavelengths span a spectral coverage of only 56.3 nm. In order to make full color, red wavelengths have been added but only with an additional silver halide emulsion or with the addition of dyes to the dichromated gelatin. The additional halide emulsion requires registration of the two layers, and the dyes greatly decrease the exposure sensitivity.

A holographic emulsion is defined as any photosensitive material capable of recording a hologram. The final hologram emulsion thickness can be controlled, and the term "swelling" is defined as the ratio of the reconstruction wavelengths to the construction wavelengths. Swelling the holographic emulsion is frequently done to change the reconstruction wavelength of the hologram. Techniques to control the reconstruction wavelength are discussed in various publications, such as "Color Control In Dichromated Gelatin Reflection Holograms", by Stephen McGrew, SPIE, 1980, Vol. 215, page 24.

However, even if the aforementioned three wavelengths are swollen to longer wavelengths, the color span still is too small for full color representation. "Full color" is meant to have at least 90 nm between red and blue centered wavelengths, with a green near the middle.

SUMMARY OF THE INVENTION

This invention provides a full color hologram by exposing the hologram in dichromated gelatin with the wavelengths 514.5 nm, 457.9 nm and 413.1 nm.

An important objective of this invention is to provide a full color hologram of the class described that is formed with a single emulsion layer.

Another important objective of this invention is the provision of a full color hologram of the class described without incurring adverse reduction in exposure sensitivity.

A further important objective of this invention is to enable the making of master holograms that contain the red, green and blue information and which can be easily copied into full color holograms.

The foregoing and other objects and advantages of this invention will appear from the following detailed description, taken in connection with the accompanying drawings of a preferred embodiment.

DESCRIPTION OF THE PREFERRED EMBODIMENT

Figure 1:
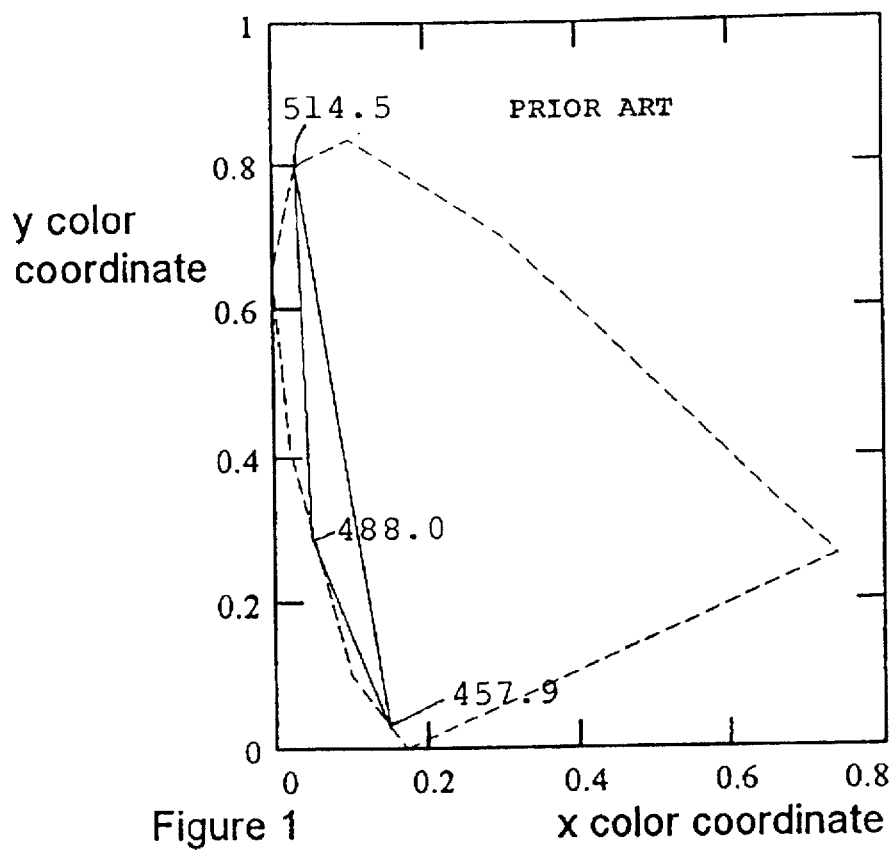
FIG. 1 is a CIE (Commission Internationale de l'Eclairage) chromaticity diagram showing the color span of a prior art hologram exposed with the three argon lines having wavelengths of 514.1 nm; 488.0 nm; and 457.9 nm and reconstructed at the same three wavelengths.
Figure 2:
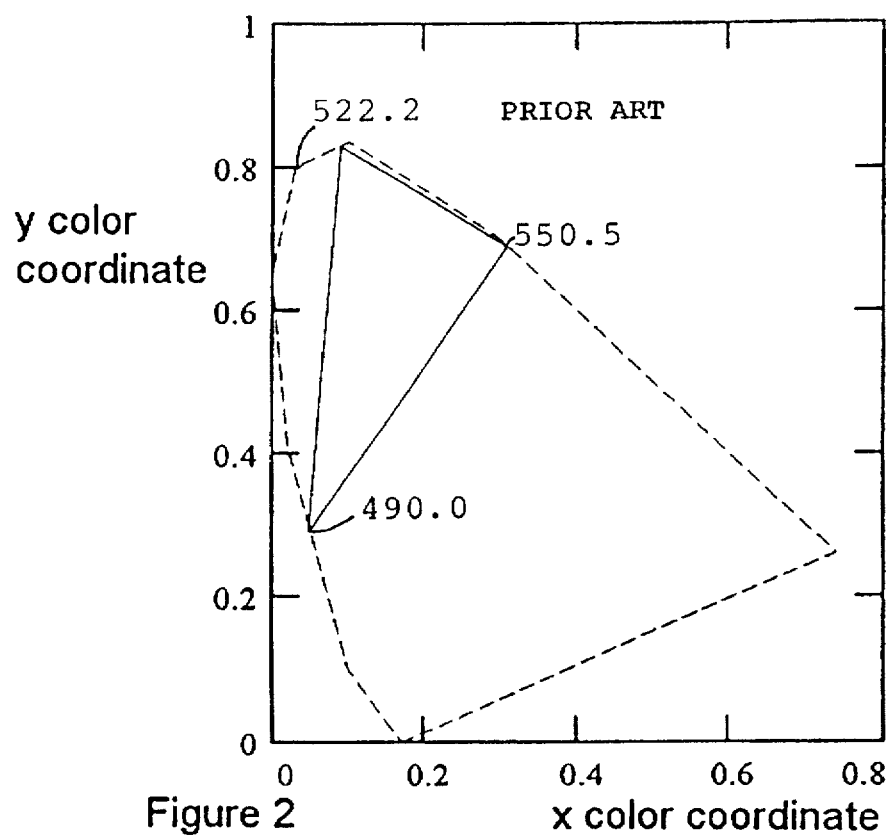
FIG. 2 is a CIE chromaticity diagram showing the color span of the prior art hologram of FIG. 1 after swelling 107% to wavelengths of 550.5 nm; 522.2 nm; and 490.0 nm.

Dichromated gelatin has ample dynamic range storage capacity to record the three independent holograms necessary for full color volumetric reflection holography. While insensitive to red and yellow light, it is naturally panchromatic through the green, blue and violet spectrum, with the shorter wavelength of light needing less exposure. As is well known, holograms are made by exposing a holographic emulsion to the fringes produced when an object beam and a reference beam interfere. A full color hologram can be made if the red information contained in the object beam is exposed with the 514.5 nm line of the argon laser beam. A second exposure with the 457.9 nm line of the argon laser contains the green information in the Ser. No. 08/048,049 object beam. And a third exposure with the 413.1 nm line of the krypton laser contains the blue information in the object beam. When this hologram is swelled 118%, the three wavelengths increase by 118% to reconstruct at 607.1 nm; 540.3 nm; and 487.5 nm.

The krypton laser has three lines, here defined as its violet lines; namely, 406.7 nm; 413.1 nm; and 415.4 nm. The 413.1 nm wavelength is the strongest, producing 1.8 watts in the model K3000 krypton laser available from Coherent Radiation Corporation of Palo Alto, Calif. This laser produces 0.9 watts of 406.7 nm wavelength and 0.4 watts of 415.4 nm wavelength. It is possible to make the full color hologram of this invention with any of these three lines, although 413.1 nm wavelength has the most power. These violet lines are produced by doubly ionized krypton ions and so they require high tube currents.

The argon laser has many lines through the blue and green region. The strongest five are at 514; 497; 488; 476; and 458 nm. The two extreme ones, 514 and 458 nm, are strong lines and dichromated gelatin is sufficiently sensitive at these wavelengths to make them the preferred blue and green argon lines. Other lines may be used, but they would not have the color separation of 514 and 458 nm, or the optical power to expose the dichromated gelatin quickly. There is a weak 528 nm line, but dichromated gelatin is not very sensitive to this wavelength.

Dichromated gelatin is much more sensitive to shorter wavelengths. The wavelength 514 nm requires hundreds of mj/cm.sq., and 457.9 nm requires only tens of mj/cm.sq. Dichromated gelatin is even more sensitive at 413.1 nm, requiring only a few mj/cm.sq.

Colors are frequently represented on a chromaticity diagram, such as that of the 1931 CIE (Commission Internationale de l'Eclairage) shown in FIGS. 1–4 of the drawings. A detailed discussion of the CIE color chart is to be found in "Measuring Color", by R. W. G. Hunt, published by Ellis Horwood in 1991. In these color charts a color is assigned an X-Y coordinate. Monochromatic colors of the spectrum are shown on the outer broken line, wherein blue is the left side portion, green is the top portion and red is the right side portion. White is in the center of the plane that is bounded by the outer broken line. The color span of the three color additive system is the set of colors bounded by said three color primaries. All of the colors in the bounded area can be generated by the three color primaries.

There is no sudden transition or absolute definition of when colors change. For purposes of this description red is subjectively defined as light between 580 nm and 650 nm; green is light between 495 nm and 560 nm; blue is light between 430 nm and 495 nm; and violet is light between 400 nm and 420 nm.

FIG. 1 shows, by the solid line triangle, the color span of a prior art hologram exposed with the three argon lines 514.1 nm (green); 488.0 nm (blue); and 457.9 nm (blue) and reconstructed at the same three wavelengths. Even when swelled 107% in FIG. 2 to 550.5 nm (green); 522.2 nm (green); and 490.0 nm (blue), the color span defined by the solid line triangle still is too small for full color representation. Greater swelling would improve the red color, but would damage the blue. Less swelling would improve the blue but damage the red.

Figure 3:
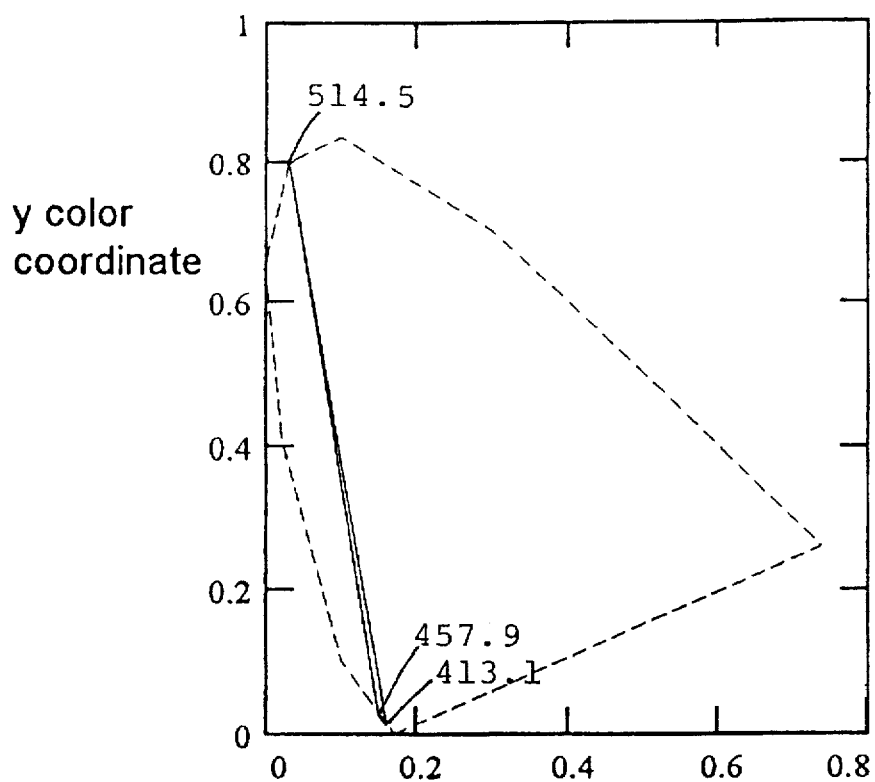
FIG. 3 is a CIE chromaticity diagram showing the color span of a hologram of this invention exposed with the three laser lines having wavelengths of 514.1 nm; 457.9 nm; and 413.1 nm and reconstructed at the same three wavelengths.

FIG. 3 shows the color span of a hologram of this invention exposed with the argon lines 514.1 nm (green); 457.9 nm (blue); and with the krypton line 413.1 nm (violet). The wavelengths 457.9 nm and 413.1 nm are nearly identical in color to the eye, so that their points on the color chart of FIG. 3 are very close to each other. While worthless as a full color hologram, the hologram is very useful as a "master" hologram because it can be copied with the same three wavelengths and then swollen to reconstruct full color, as in FIG. 4. Information on the making and using of master holograms, as well as other general information on holography, is to be found in "Optical Holography", by Collier, Burckhardt and Lin, published 1971 by Academic Press, New York; in "Proceedings of the International Symposium of Display Holography", Volumes I, II and III, Lake Forest College, Lake Forest, Ill.; and "Manual of Practical Holography", by Graham Saxby, published 1991 by Focal Press.

Figure 4:
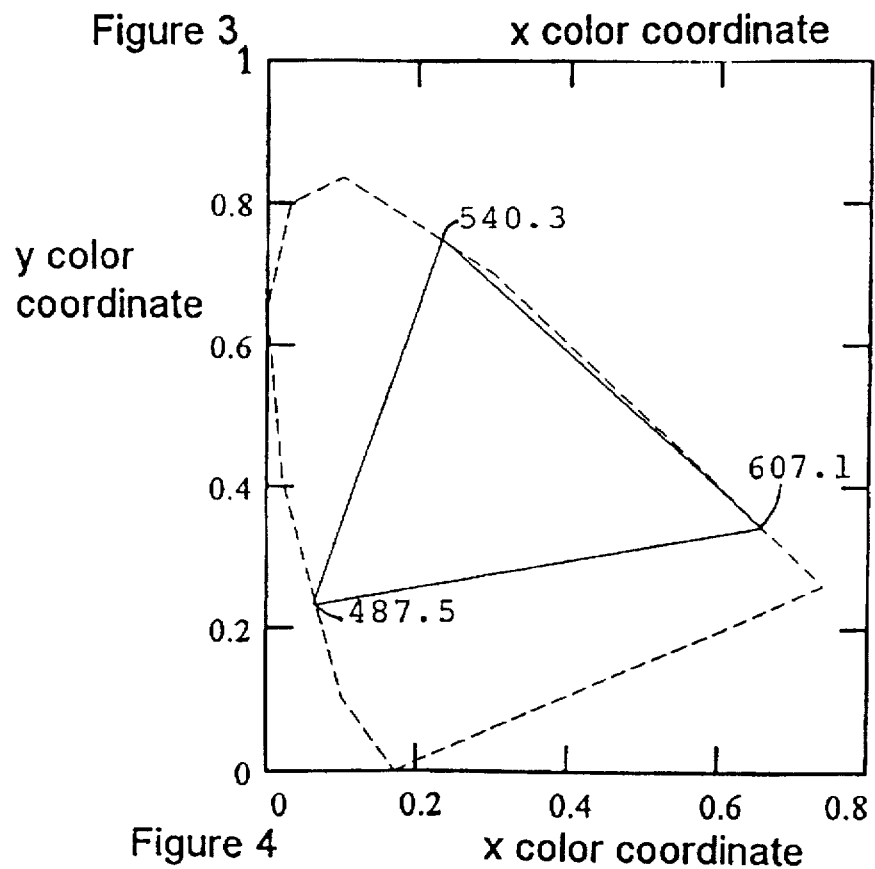
FIG. 4 is a CIE chromaticity diagram showing the color span of the hologram of FIG. 3 after swelling 118% to wavelengths of 607.1 nm; 540.3 nm; and 487.5 nm.

When swelled 118% in FIG. 4 to 607.1 nm (red); 540.3 nm (green); and 487.5 nm (blue), all colors within the solid line triangle can be produced by combinations of the three monochromatic colors. For purposes of this invention the swelling of 118% in FIG. 4 is preferred, although swelling between 114% and 122% is acceptable. More swelling shifts all three colors redder, while less swelling shifts them bluer.

Frequently in holography one needs to make a "master" hologram that can reconstruct well with laser light so it can be holographically copied. A three color master hologram can be made by exposing the emulsion with light of the three wavelengths 514 nm, 458 nm and 413 nm, while maintaining the swelling constant during all three exposures, and developing the emulsion such that the final thickness is the same as the original thickness during exposure, i.e. swelling the emulsion back to its original thickness (100%). These three wavelengths can then be used to copy the master hologram.

As discussed hereinbefore, previous attempts at making full color holograms have usually used red, green and blue lasers to record the light reflected off a colored object. However, this requires the additional silver halide emulsion or sensitivity-decreasing dyes. In the present invention, the three wavelengths are in the green, blue and violet, and, as previously mentioned and shown in FIG. 3, could not be used to record a color hologram directly from a natural object because the red content of the object would never be recorded.

There are many ways available to record a color hologram using green, blue and violet light of the present invention. One example of this artificial coloration is to paint an actual object with green, blue and violet paint. Where one wanted the object to be red, paint it green so that the green laser light would reflect. Where one wanted the object to be green, paint it blue so the blue laser would reflect. Where one wanted the object to be blue, paint it violet so the violet laser would reflect.

A second example is to make a color photograph of an object and separate the color photograph into black and white photographs of the red, green and blue content of the image. Then take a hologram of each black and white photograph using the correct laser to expose. The red separation would be exposed with the green laser, the green separation would be exposed with the blue laser, and the blue separation would be exposed with the violet laser.

A third example is to produce the color information from an electronic video signal displayed on an electronic image modulator. A good electronic image modulator is a liquid crystal image transducer, although any means that modulates incidental light with an image may be utilized. The electronic video signal containing the red, green and blue scene information can be generated by a computer or by a television camera recording an actual scene. This color image would be broken into its three color separations electronically and each one would be exposed as the color photograph separations were.

An example of scene information generated by computer is the solid modeling program "Studio 3D" by Autodesk of Sausalito, Calif. This program can generate colored solid objects in a computer, then rotate the viewpoint to generate all the perspective views needed to make the hologram.

It will be apparent to those skilled in the art that various changes may be made in the details described hereinbefore, without departing from the spirit of this invention and the scope of the appended claims.

I claim:

1. A method of making a three color hologram containing red, green and blue content, comprising exposing a single holographic emulsion with interference fringes produced by an object beam and a reference beam from a green line of a laser, a blue line of a laser and a violet line of a laser, wherein the object beam of said green exposure contains the red content of the image, the object beam of said blue exposure contains the green content of the image and the object beam of said violet exposure contains the blue content of the image, maintaining the swelling constant during all three exposures, and developing the emulsion in a way that controls the swelling of the developed emulsion.

2. The method of claim 1 including the additional step of controlling swelling of the developed emulsion so that the hologram reconstructs with the same three wavelengths with which it was recorded, whereby to produce a master hologram.

3. The method of claim 1 including the additional step of controlling swelling of the developed emulsion so that the developed hologram reconstructs with red, green and blue light, whereby to produce a full color hologram when viewed.

4. The method of claim 1 wherein the green line is the 514.5 nm line of an argon laser and the blue line is the 457.9 nm line of an argon laser.

5. The method of claim 4 wherein the violet line is the 413.1 nm line of a krypton laser.

6. The method of claim 4 including the additional step of swelling the emulsion between 114% and 122%.

7. The method of claim 4 including swelling the developed emulsion to 118%.

8. A reflection holographic article whose maximum reconstruction for blue light is about 487 nm, for green light is about 450 nm, and for red light is about 607 nm and whose thickness is about 114–122% of the thickness during exposure.

9. A master reflection holographic article which reconstructs with green, blue and violet light wherein the green interference fringes contain the red content of an image, the blue interference fringes contain the green content of an image, and the violet interference fringes contain the blue content of an image.

* * * * *

UNITED STATES PATENT AND TRADEMARK OFFICE
CERTIFICATE OF CORRECTION

PATENT NO. : 5,731,108
DATED : March 24, 1998
INVENTOR(S) : JONATHAN R. BILES

It is certified that error appears in the above-identified patent and that said Letters Patent is hereby corrected as shown below:

Column 2, line 21, delete "Ser. No. 08/048,049".

Signed and Sealed this

Twenty-sixth Day of May, 1998

*Attest:*

BRUCE LEHMAN

*Attesting Officer*  Commissioner of Patents and Trademarks